(12) United States Patent
Nilsson

(10) Patent No.: US 6,725,055 B2
(45) Date of Patent: Apr. 20, 2004

(54) SIR ESTIMATION USING DELAY TIME OF POWER CONTROL COMMANDS

(75) Inventor: Johan Nilsson, Malmö (SE)

(73) Assignee: Telefonaktiebolaget LM Ericsson (PUBL), Stockholm (SE)

(*) Notice: Subject to any disclaimer, the term of this patent is extended or adjusted under 35 U.S.C. 154(b) by 625 days.

(21) Appl. No.: 09/755,652

(22) Filed: Jan. 5, 2001

(65) Prior Publication Data

US 2003/0022685 A1 Jan. 30, 2003

(51) Int. Cl.[7] .............................. H04Q 7/20; H04B 7/00
(52) U.S. Cl. .......................................... 455/522; 455/69
(58) Field of Search .................. 455/69, 522, 67.13; 370/347

(56) References Cited

U.S. PATENT DOCUMENTS

| | | | |
|---|---|---|---|
| 5,881,367 A | 3/1999 | Calot et al. | 455/69 |
| 5,893,035 A | 4/1999 | Chen | 455/522 |
| 5,924,043 A | 7/1999 | Takano | 455/522 |
| 5,933,782 A | 8/1999 | Nakano et al. | 455/522 |
| 5,959,980 A | 9/1999 | Scott | 370/280 |
| 5,982,760 A | 11/1999 | Chen | 370/335 |
| 5,995,538 A | 11/1999 | Lomp | 375/208 |
| 6,377,607 B1 * | 4/2002 | Ling et al. | 375/130 |
| 6,404,826 B1 * | 6/2002 | Schmidl et al. | 375/340 |
| 6,493,541 B1 * | 12/2002 | Gunnarsson et al. | 455/69 |

FOREIGN PATENT DOCUMENTS

| | | |
|---|---|---|
| EP | 0863618 | 9/1998 |
| EP | 0955735 | 11/1999 |

OTHER PUBLICATIONS

EPO Search Report, RS 106461 US, dated Sep. 12, 2001.

* cited by examiner

*Primary Examiner*—Nguyen T. Vo
*Assistant Examiner*—Farima Farkhondar
(74) *Attorney, Agent, or Firm*—Jenkens & Gilchrist, P.C.

(57) ABSTRACT

A method is provided for estimating the SIR of signals transmitted between a mobile unit and a base station, wherein the signals comprise pilot and data symbol blocks transmitted during each of a succession of time slots. Initially, the signals of a group of slots are directed to the receiver, which may be either the mobile unit receiver or the base station receiver. SIR estimates and corresponding power changes are computed for each slot in the initial group, employing only respective pilot symbols thereof. The SIR estimates derived from the initial slot group are used to compute the delay time of power control commands sent from the receiver to the transmitter, in order to adjust the power level thereof. The SIR for signals of a specified slot, which follows the initial slot group, is then estimated from the time delay, from the pilot block of the specified slot, and from the data block of the slot immediately preceding the specified slot, collectively.

18 Claims, 2 Drawing Sheets

SIR ESTIMATION USING DELAY TIME OF POWER CONTROL COMMANDS

BACKGROUND OF THE INVENTION

1. Technical Field of the Invention

The invention disclosed and claimed herein generally pertains to a method and apparatus for estimating the signal-to-interference ratio (SIR) of signals transmitted to a receiver through an air interface. More particularly, the invention pertains to a method and apparatus of the above type wherein accuracy is significantly improved by employing received data symbols as well as pilot symbols in the SIR estimation. Even more particularly, the invention pertains to a method and apparatus of the above type wherein delay time encountered in the transmission power control loop is determined and used in SIR estimation.

2. Description of Related Art

As is well known by those of skill in the art, power control is important for capacity and efficiency in mobile code division multiple access (CDMA) systems. For example, if a mobile transmission/receiver unit is located close to a base station transmitter/receiver, the power level of signals transmitted to the mobile unit from the base station, in the absence of adjustment, would be comparatively high. This could interfere with transmissions to other mobile units located farther from the base station. Conversely, the signal power of transmissions from a mobile unit which was located far from the base station could be comparatively weak. Accordingly, it has become common practice to provide a base station with a transmission power control (TPC).

Currently, power control is accomplished by estimating the signal-to-interference ratio (SIR) of received signals. If the SIR of a signal received at a mobile unit is lower than a threshold value, a command or adjustment signal is sent to the transmitting base station to increase transmission power. The command is sent on the reverse link of the communication system, which could be either the uplink or the downlink, depending on which link is controlled. If the estimated SIR is higher than the threshold value, a command to decrease transmission power is sent. In a common arrangement for mobile transmission systems, signals are transmitted during each of a succession of time slots, each slot containing a block of pilot symbols and a block of data symbols. In such arrangement, the SIR estimation is carried out by using received pilot symbols, which are known in advance to the receiver. However, comparatively few of the transmitted signals comprise pilot symbols. Thus, a significant limitation is placed on the accuracy of the SIR estimation.

In one approach to overcome this limitation, the SIR is estimated from both pilot symbols of a transmitted slot, and data symbols of the preceding slot. However, in an arrangement of the above type transmission power is changed at the beginning of each slot. This power change must be known, in order to use pilot and data symbols from different slots in an SIR measurement. Moreover, since power changes at the transmitter are made in response to power control commands generated by the receiver, as described above, a finite period of time is required to send power control commands to the transmitter back from the receiver, and to then change power levels in response thereto. If this time period, referred to herein as delay time, is known, the change in power level between two particular slots can be readily determined at the transmitting base station. Such power change information is generally available, since it is retained after responding to successive power control commands. However, frequently the delay time will not be known. For example, it may not be known whether the delay is a single slot delay $\Delta_1$ or a two-slot delay $\Delta_2$. Also, the time delay can change if the mobile unit is moved from one cell to another. In either case, uncertainty as to the delay time will generally prevent using pilot symbols from one slot with data symbols from another slot to estimate SIR, since it will be very difficult or impossible to determine power change therebetween, so that compensation can be made in the estimation.

SUMMARY OF THE INVENTION

The invention is generally directed to an improved technique for estimating SIR of signals transmitted between a base station and a mobile unit of a mobile communication system, wherein the signals comprise pilot and data symbol blocks transmitted during each of a succession of time slots. The method of the invention includes the step of receiving the signals of a specified one of the slots, as well as the signals of the slot immediately preceding the specified slot, after transmission through an air interface. The method further comprises the steps of computing the delay time of associated power control commands sent back to the transmitter from the receiver; and estimating the SIR of signals of the specified slot from both the pilot block of the specified slot, and from the data block of the immediately preceding slot. A component or factor is incorporated into the SIR estimate which compensates for a change in power level between the specified slot and the immediately preceding slot, wherein the compensating component is determined from the time delay. The SIR estimate thereby becomes more accurate, and thus enables more accurate adjustment of transmission power.

In a preferred embodiment of the invention, the time delay is employed to identify or select the correct value for the power change between the specified slot and the immediately preceding slot from a succession of power changes, which have previously been generated and are respectively retained at the base station. Preferably, the method further comprises receiving the signals of each slot in an initial group of slots, wherein the transmission of the initial group precedes transmission of the specified slot, and then providing a SIR estimate and corresponding power change for each slot of the initial group. The SIR estimates for the slots of the initial group are determined only from respective pilot blocks thereof. The delay time is then computed by correlating the SIR estimates of the initial slot group with their respectively corresponding power changes.

In a very useful embodiment, respective signals of the initial slot group and the specified slot are transmitted from the base station and received at a mobile unit. However, in an alternative embodiment the signals are transmitted from a mobile unit, and received at the base station.

In a further useful embodiment, the invention is used in connection with a communication system employing CDMA. However, the invention could also be used in a time division multiple access (TDMA) system.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

It is to be emphasized that the principle of the invention is directly applicable to the downlink case, that is, transmission of signals from the base station to a mobile unit, as well as to the uplink case, that is, transmission of signals from a mobile unit to the base station. For purposes of illustration only, an embodiment of the invention directed to the uplink case is set forth hereinafter, which is best understood by referring to FIGS. 1–3 of the drawings, like numerals being used for like and corresponding parts of the various drawings. However, it is to be understood that such illustrative embodiment is by no means intended to limit the scope of the invention.

Figure 1:
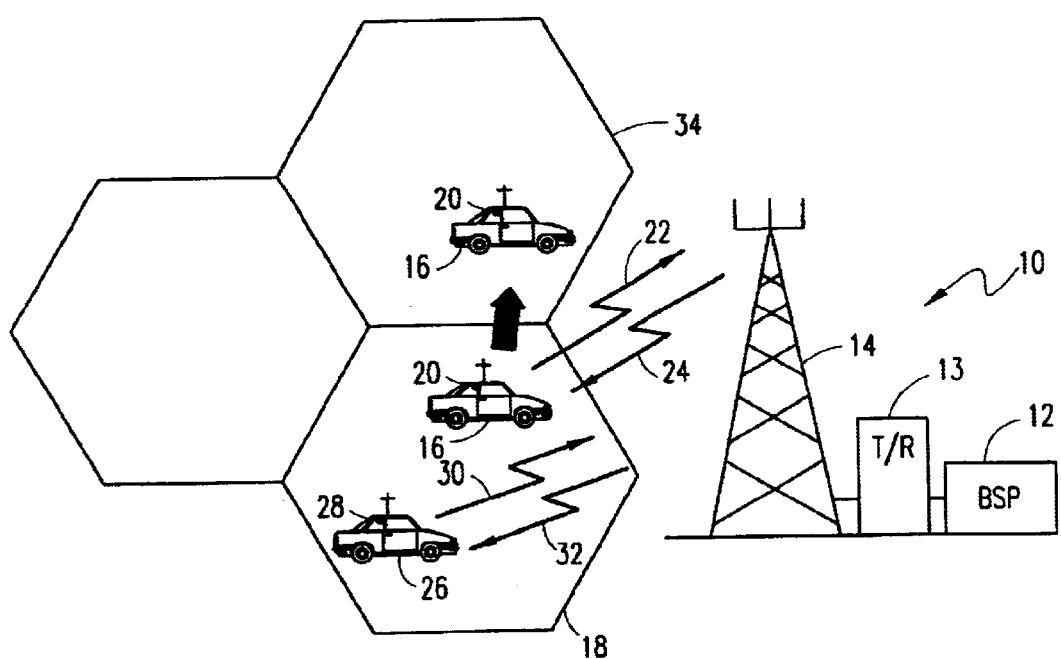
FIG. 1 is a block diagram depicting a wireless communication system employing an embodiment of the invention.

Referring to FIG. 1, there are shown principal elements of a mobile or wireless telecommunication system which incorporates an embodiment of the invention. The communication system includes a base station 10, comprising base station processor electronics 12, a transmitter and receiver unit 13, and an antenna 14. FIG. 1 further shows a vehicle 16 within a cell 18, i.e., a geographic area served by base station 10, and a mobile telephone unit 20 carried in vehicle 16. Mobile unit 20, which may be hand held or vehicle mounted, comprises a transmitter and receiver for respectively transmitting signals to and receiving signals from base station 10. Signal transmission and reception paths of mobile unit 20 are respectively depicted in FIG. 1 as uplink 22 and downlink 24.

Referring further to FIG. 1, there is shown a vehicle 26 and mobile telephone unit 28 also located within cell 18, unit 28 being similar or identical to mobile unit 20, and communicating with base station 10 over a 2-way transmission path comprising an uplink 30 and a downlink 32. As stated above, transmissions to and from mobile units like mobile unit 28 interfere with transmissions to and from mobile unit 20. Accordingly, processor 12 of base station 10 is equipped with a TPC (not shown). The TPC provides the capability to determine the SIR of transmissions to base station 10 from mobile unit 20, to provide power control commands thereto by means of downlink 24, to continually change the transmission power level of mobile unit 20, in response to the power control commands.

The construction of base station processor 12, in order to estimate the SIR and generate power control commands corresponding thereto, in accordance with prior art techniques of the type described above, is considered to be well established and well known to those of skill in the art. However, it is to be understood that upon reception of a signal transmission from mobile unit 20, a finite period of time is required in order to estimate the SIR of the received transmission, to send the power control command back to mobile unit 20 from base station 10, and to adjust the transmission power of mobile unit 20 from one level to another. The time required to perform all of these tasks, collectively, comprises a delay time Δ. As likewise stated above, successive power level changes sent to mobile unit 20 are retained at base station 10. However, time delay Δ frequently will not be known with sufficient precision. For example, it may not be possible to determine the time needed to perform one or more of the above tasks of the transmission power control loop. Also, mobile unit 20 may move from cell 18 into another cell 34, having a different time delay. Thus, when signals of a slot are received at the base station, it will not be known which previous power change was applied to the signals.

Figure 2:
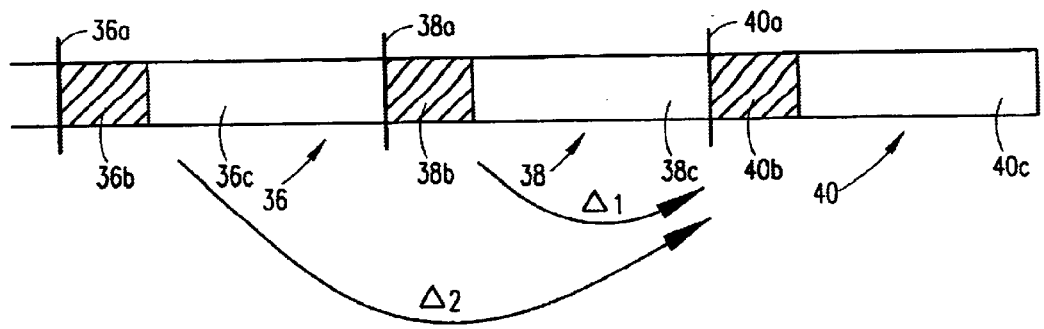
FIG. 2 is a schematic diagram depicting signal and time slot structure with which an embodiment of the invention is used.

Referring to FIG. 2, there is shown the time slot structure for signals received at base station 10, after transmission from mobile unit 20 over uplink 22. More particularly, there are shown such signals contained in a succession of time slots 36–40, which commence at slot borders 36a–40a, respectively. The signals in each time slot comprise a block of pilot symbols followed by a block of data symbols. Thus, slots 36–40 respectively contain pilot blocks 36b–40b and data blocks 36c–40c.

In a common arrangement, the process of generating a power control command at the base station and sending it to the transmitter, as described above, commences upon receiving the pilot block of a time slot, such as pilot block 36b of slot 36, or pilot block 38b of slot 38. If the time delay Δ, as defined above, is of value $\Delta_1$, so that it is less than the period of one time slot, a power change at slot border 40a of slot 40, in order to change the power levels of pilot block 40b and data block 40c thereof, would be derived from pilot block 38b of slot 38. However, if the time delay Δ is of value $\Delta_2$, that is, between one and two time slot periods as shown in FIG. 2, the power change at slot border 40a of slot 40 would be derived from pilot block 36b of slot 36. Thus, it is seen that delay time Δ of the power control commands must be known, in order to determine what the power change has been from one slot to another.

In accordance with the invention, it has been recognized that accuracy in SIR estimation can be significantly improved by using data signal information in the estimating process as well as pilot symbol information. For example, it has been recognized that accuracy would be improved by employing the pilot symbol block 40b of time slot 40 together with the data block 38c of time slot 38. As shown by FIG. 2, time slot 38 immediately precedes time slot 40 in the succession of transmitted and received time slots. However, it has been recognized further that in order to use pilot symbol and data symbol information from two different time slots to estimate SIR, the change in power levels between the two slots must be known, so that compensation can be made therefor in the SIR estimation process. However, as stated above, frequently it will not be known whether the delay time Δ is $\Delta_1$, $\Delta_2$, or some other value.

Figure 3:
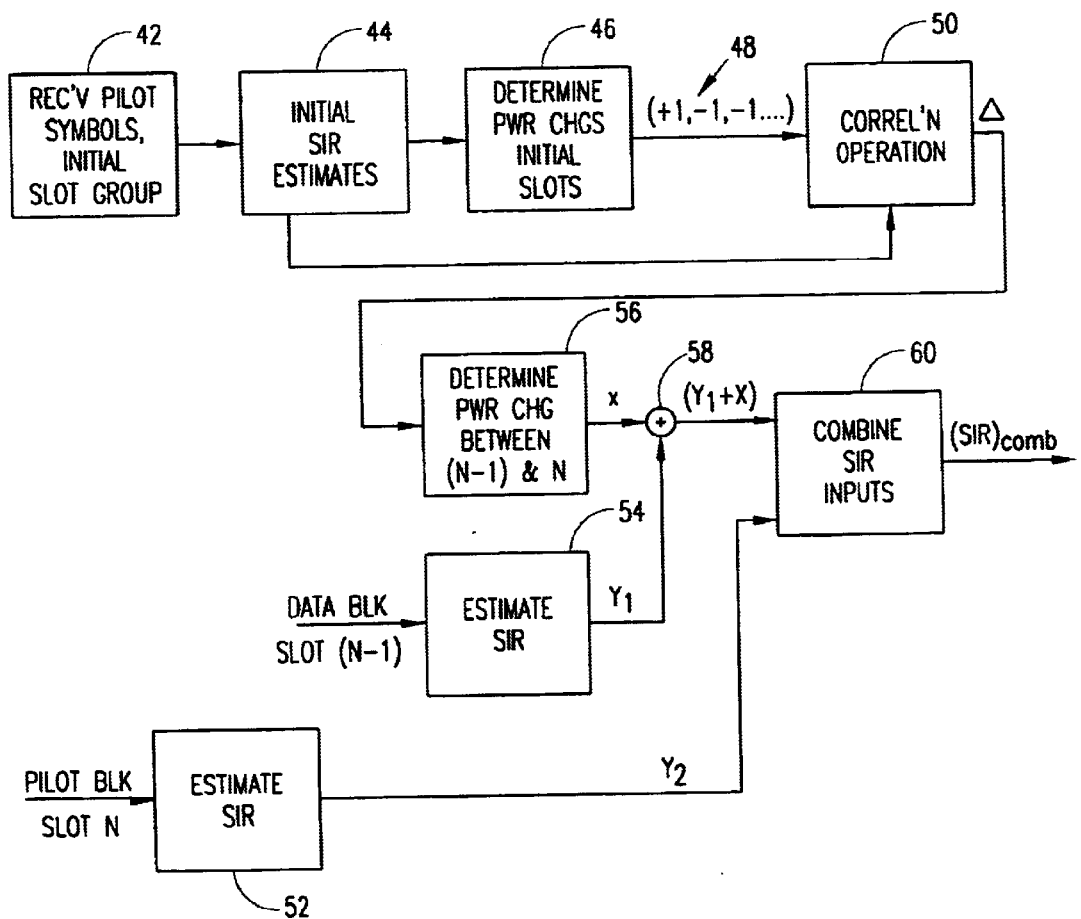
FIG. 3 is a block diagram illustrating functional steps for an embodiment of the invention.

As shown by FIG. 3, the initial step in determining time delay Δ is to receive respective pilot symbol blocks of an initial group of successive time slots at the base station 10, indicated by function block 42. The initial group may comprise on the order of 10–15 successive time slots, although the invention is by no means limited thereto. As shown by process block 44, the pilot block of each slot of the initial group is employed to estimate a corresponding SIR. Each of the initial SIR estimates provides a power change, as shown by process block 46, which is either +1 or −1 and which is sent to mobile unit 20 to increase or decrease transmission power level, respectively, by one db. The output of process block 46 comprises a sequence of power changes, e.g., sequence 48 shown in FIG. 3, and each power change is cross-correlated with its corresponding SIR estimate at process block 50. The cross-correlation operation, comprising a well-known mathematical procedure, provides the delay time Δ. More specifically, the correlation generates a function having a peak at the delay time. As stated above, Δ may be $\Delta_1$, $\Delta_2$, or other value.

Referring further to FIG. 3, process block 52 shows a SIR estimate $Y_2$ derived from the pilot symbol block of a slot N, such as block 40b of slot 40. There is also shown, at process block 54, a SIR estimate $Y_1$ derived from the data symbol block of slot (N−1), such as block 38c of slot 38 shown in FIG. 2. The signals of slots (N−1) and N are received at base station 10, after reception of the signals of the initial slot group.

From the value of $\Delta$ provided by the correlation operation, the power level change between slots (N−1) and N can be readily determined, as indicated at process block 56. For example, if slots (N−1) and N are slots 38 and 40 shown in FIG. 2, respectively, and if $\Delta$ is determined to be $\Delta_1$, the power change at the slot border 40a, between slots 38 and 40, will be derived from the SIR estimate of the signals in slot 38. As stated above, such power change information will be retained and available at base station 10. On the other hand, if $\Delta$ is determined to be $\Delta_2$, the power change at slot border 40a will be derived from the SIR estimate of signals in slot 36, and will likewise be available.

The output of process block 56, representing the power change or differential X between the slots (N−1) and N, is in the same dimensions as the SIR estimates $Y_1$ and $Y_2$. Both the SIR estimate $Y_1$ and the power change quantity X are coupled to an adder 58 to provide a SIR estimate $(Y_1+X)$, which represents compensation for the power change between slots (N−1) and N. To provide a SIR estimate of improved accuracy, the power compensated SIR derived from the data symbols is then combined with the SIR estimate $Y_2$ at process block 60. The output thereof comprises the improved estimate $(SIR)_{comb}$. $(SIR)_{comb}$ could be generated, for example, by determining the mean value of $(Y_1+X)$ and $Y_2$ in process block 60, so that $(SIR)_{comb}$ would be equal to $[(Y_1+X)+Y_2]/2$.

It will be appreciated that the correlation and SIR estimation procedures referred to in connection with FIG. 3, as well as other mathematical procedures shown therein, are individually well known and could respectively be readily implemented by processor 12.

As stated above, in an alternative embodiment signals as shown in FIG. 2 would be transmitted from base station 10 to mobile unit 20, and processed as described above to improve SIR estimation. In WDCMA it is the power control delay for the downlink that is unknown.

In a few cases (typically <5%) the power command will have a transmission error. In these cases it is believed that the power is changed in one direction, but in reality it is changed in the opposite direction. When these error events are relatively few, the compensation will help to improve the average SIR estimation accuracy.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. In a communication system provided with a first unit disposed to transmit signals which comprise pilot and data symbol blocks in each of a succession of time slots, and further provided with a remotely located second unit disposed to receive said transmitted signals, a method for estimating the SIR of said transmitted signals at said receiving second unit, said method comprising the steps of:
   receiving the signals of a specified one of said slots, as well as the signals of the slot immediately preceding said specified slot in said succession, at said second unit;
   computing the delay time of power control commands respectively sent from said second unit to said first unit, to adjust the transmission power level thereof;
   estimating the SIR of signals of said specified slot from the pilot block of said specified slot and from the data block of said immediately preceding slot, collectively; and
   incorporating a component into said SIR estimate which compensates for a power change between said specified slot and said immediately preceding slot, said compensating component being determined from said delay time.

2. The method of claim 1 wherein:
   said delay time is employed to select said power change between said specified slot and said immediately preceding slot from a succession of power changes respectively retained at one of said units.

3. The method of claim 1 wherein:
   said transmitting first unit comprises a base station for a wireless communication system, and said receiving second unit comprises a mobile unit therefor.

4. The method of claim 1 wherein:
   said transmitting first unit comprises a mobile unit for a wireless communication system, and said receiving second unit comprises a base station therefor.

5. The method of claim 2 wherein said method further comprises:
   receiving the signals of each group in an initial group of slots at said second unit, said initial slot group preceding said specified slot;
   providing a SIR estimate and a corresponding power change for each slot of said initial group; and
   computing said delay time as a function of said SIR estimates of said initial slot group and their respectively corresponding power changes.

6. The method of claim 5 wherein:
   said delay time computing step comprises correlating each of said SIR estimates of said initial slot group with its corresponding power change.

7. The method of claim 6 wherein:
   said signals are transmitted from said first unit to said second unit through an air interface.

8. The method of claim 6 wherein:
   said communication system employs code division multiple access.

9. The method of claim 6 wherein:
   said communication system employs time division multiple access.

10. A communication system comprising:
    a first unit disposed to transmit signals comprising pilot and data symbol blocks during each of a succession of time slots;
    a second unit spatially separated from said transmitter, said second unit disposed to receive said transmitted signals of said succession of time slots and to send power control commands to said transmitting first unit to selectively change transmission power levels, said power control commands having an associated time delay; and
    processing means for estimating the SIR of the signals of a specified time slot in said succession, wherein said SIR estimation is derived from said time delay, from the pilot block of said specified slot, and from the data block of the slot immediately preceding said specified slot in said succession, collectively.

11. The apparatus of claim 10 wherein:

said second unit is disposed to receive the signals of each slot in an initial group of slots which respectively precede said specified slot; and said processing means comprises means for providing a SIR estimate and a corresponding power change for each slot of said initial slot group, said processing means further comprising means for computing said delay time as a function of said SIR estimates of said initial slot group and the respective corresponding power changes thereof.

12. The apparatus of claim 10 wherein:

said transmitting first unit comprises a base station for a wireless communication system, and said receiving second unit comprises a mobile unit therefor.

13. The method of claim 10 wherein:

said transmitting first unit comprises a mobile unit for a wireless communication system, and said receiving second unit comprises a base station therefor.

14. The apparatus of claim 11 wherein:

said processing means comprises means for determining a power change between said pilot block of said specified slot and the data block of said immediately preceding slot from said computed delay time.

15. The apparatus of claim 14 wherein:

said processing means comprises means for computing said delay time by correlating said SIR estimates of said initial slot group with their respective corresponding power changes.

16. The apparatus of claim 15 wherein:

signals are transmitted from said first unit to said second unit through an air interface.

17. The apparatus of claim 16 wherein:

said communication systems employs code division multiple access.

18. The apparatus of claim 16 wherein:

said communication system employs time division multiple access.

* * * * *